(12) United States Patent
Corem

(10) Patent No.: US 8,290,469 B2
(45) Date of Patent: Oct. 16, 2012

(54) SYSTEM AND METHOD FOR ASSOCIATING COMMUNICATION TERMINALS TO USERS BASED ON SPATIAL CORRELATION

(75) Inventor: Yochai Corem, Herzliya (IL)

(73) Assignee: Verint Americas, Inc., Roswell, GA (US)

( * ) Notice: Subject to any disclaimer, the term of this patent is extended or adjusted under 35 U.S.C. 154(b) by 154 days.

(21) Appl. No.: 12/753,137

(22) Filed: Apr. 2, 2010

(65) Prior Publication Data

US 2010/0255857 A1 Oct. 7, 2010

(30) Foreign Application Priority Data

Apr. 7, 2009 (IL) .......................................... 198069

(51) Int. Cl.
*H04M 11/04* (2006.01)
(52) U.S. Cl. ................ 455/404.1; 455/404.2; 455/456.1; 455/456.3
(58) Field of Classification Search ................ 455/404.1, 455/404.2, 410, 411, 414.1, 414.2, 456.1, 455/456.2, 456.3, 445, 432.3, 417
See application file for complete search history.

(56) References Cited

U.S. PATENT DOCUMENTS

| 7,190,969 | B1 * | 3/2007 | Oh et al. ........................ 455/551 |
| 7,275,073 | B2 * | 9/2007 | Ganji et al. .................... 707/621 |
| 7,983,249 | B2 * | 7/2011 | Galluzzo et al. .............. 370/359 |
| 2007/0249325 | A1 * | 10/2007 | Blight et al. ................ 455/412.1 |
| 2009/0098857 | A1 * | 4/2009 | De Atley ........................ 455/411 |
| 2009/0138426 | A1 * | 5/2009 | Ishikawa ............................ 707/1 |
| 2010/0005520 | A1 * | 1/2010 | Abbot et al. ....................... 726/6 |
| 2010/0048167 | A1 * | 2/2010 | Chow et al. .................... 455/410 |
| 2010/0121930 | A1 * | 5/2010 | Blight et al. ................... 709/206 |
| 2010/0197362 | A1 * | 8/2010 | Saitoh et al. ............... 455/569.2 |
| 2010/0210239 | A1 * | 8/2010 | Karaoguz et al. ............. 455/411 |

FOREIGN PATENT DOCUMENTS

WO 03088634 A1 10/2003

OTHER PUBLICATIONS

Treu, Georg et al., "Extending the LBS-framework TraX: Efficient proximity detection with dead reckoning," Computer Communications, Elsevier Science Publishers BV, Amsterdam, NL LNKD-DOI: 10.1016/J.COMCOM.2007.12.013, vol. 31, No. 5, Dec. 25, 2007, pp. 1040-1051, XP022518022ISSN: 0140-3664.

Küpper, Axel et al., "TraX: A Device-Centric Middleware Framework for Location-Based Services," IEEE Communications magazine, IEEE Service Center, Piscataway, US LNKD-DOI:10.1109/MCOM. 2006.1705987, vol. 44, No. 9, Sep. 1, 2006, pp. 114-120, XP001547401ISSN: 0163-6804.

Extended European Search Report, dated Jul. 27, 2010, received from the European Patent Office.

* cited by examiner

*Primary Examiner* — Jean Gelin
(74) *Attorney, Agent, or Firm* — McKeon, Meunier, Carlin & Curfman

(57) ABSTRACT

Methods for associating multiple communication terminals with a given user, based on the geographical locations of the terminals. A target user may be known to own or operate a certain communication terminal (e.g., cellular phone). To identify additional terminals associated with this user, historical location indications are obtained for the known terminal. Each location indication indicates the geographical location of the terminal at a given time. The location indications of the known terminal are correlated with location indications of other terminals. When significant spatial correlation is found between the known terminal and another terminal, the other terminal is assumed likely to be associated with the same target user.

18 Claims, 3 Drawing Sheets

SYSTEM AND METHOD FOR ASSOCIATING COMMUNICATION TERMINALS TO USERS BASED ON SPATIAL CORRELATION

FIELD OF THE DISCLOSURE

The present disclosure relates generally to communication systems, and particularly to methods and systems for associating mobile communication terminals with users.

BACKGROUND OF THE DISCLOSURE

Mobile communication networks deploy various techniques for measuring the geographical locations of wireless communication terminals. Such techniques are used, for example, for providing Location Based Services (LBS) and emergency services in cellular networks. Some location tracking techniques are based on passive probing of network events generated by the wireless terminals. Other techniques are active, i.e., proactively request the network or the terminal to provide location information.

SUMMARY OF THE DISCLOSURE

An embodiment that is described herein provides a method, including:

obtaining first location indications of a first communication terminal that is associated with a given user;

using the first location indications, determining one or more candidate communication terminals that are suspected of being associated with the given user;

computing a correlation between the first location indications and second location indications of the identified candidate communication terminals; and responsively to the correlation, identifying from among the candidate communication terminals at least one second communication terminal that is associated with the given user.

In some embodiments, the first and second location indications include location measurements received from at least one communication network with which one or more of the communication terminals communicate. In an embodiment, the first location indications are received from a first communication network, and the second location indications of the second communication terminal are received from a second communication network, different from the first communication network. In another embodiment, the first location indications are measured using a first location measurement technique, and the second location indications of the second communication terminal are measured using a second location measurement technique, different from the first location measurement technique.

In a disclosed embodiment, determining the candidate communication terminals includes selecting an initial set of the candidate communication terminals whose second location indications are correlative with the first location indications at a first time interval, and removing from the set at least one of the candidate communication terminals whose second location indications are not correlative with the first location indications at a second time interval, different from the first time interval. In another embodiment, computing the correlation includes identifying a positive correlation indication between the first communication terminal and a given candidate communication terminal, which indicates that a distance between the first communication terminal and the given candidate communication terminal was less than a predefined value during a given time interval. In yet another embodiment, computing the correlation includes identifying a negative correlation indication between the first communication terminal and a given candidate communication terminal, which indicates that a distance between the first communication terminal and the given candidate communication terminal was larger than a predefined value during a given time interval. Identifying the negative correlation indication may include assigning a confidence level to the negative correlation indication responsively to an activity of the first communication terminal and the given candidate communication terminal during the given time interval.

In some embodiments, computing the correlation includes processing the first location indications to produce a first time series representing a first location of the first communication terminal as a function of time, processing the second location indications of one of the candidate communication terminals to produce a second time series representing a second location of the one of the candidate communication terminals as a function of the time, and comparing the first and second time series. Processing the first and second location indications may include interpolating the respective first and second location indications to produce the first and second time series. In some embodiments, the method includes presenting the identified at least one second communication terminal to an operator.

In an embodiment, computing the correlation includes computing respective correlation scores for at least some of the candidate communication terminals, and selecting the at least one second communication terminal responsively to the correlation scores. In some embodiments, the identified at least one second communication terminal and the respective correlation scores are presented to an operator.

There is additionally provided, in accordance with an embodiment of the present invention, apparatus, including:

an interface, which is coupled to accept location indications of communication terminals; and a processor, which is configured to determine, using first location indications of a first communication terminal that is associated with a given user, one or more candidate communication terminals that are suspected of being associated with the given user, to compute a correlation between the first location indications and second location indications of the identified candidate communication terminals, and to identify from among the candidate communication terminals, responsively to the correlation, at least one second communication terminal that is associated with the given user.

The present disclosure will be more fully understood from the following detailed description of the embodiments thereof, taken together with the drawings in which:

Figure 1:
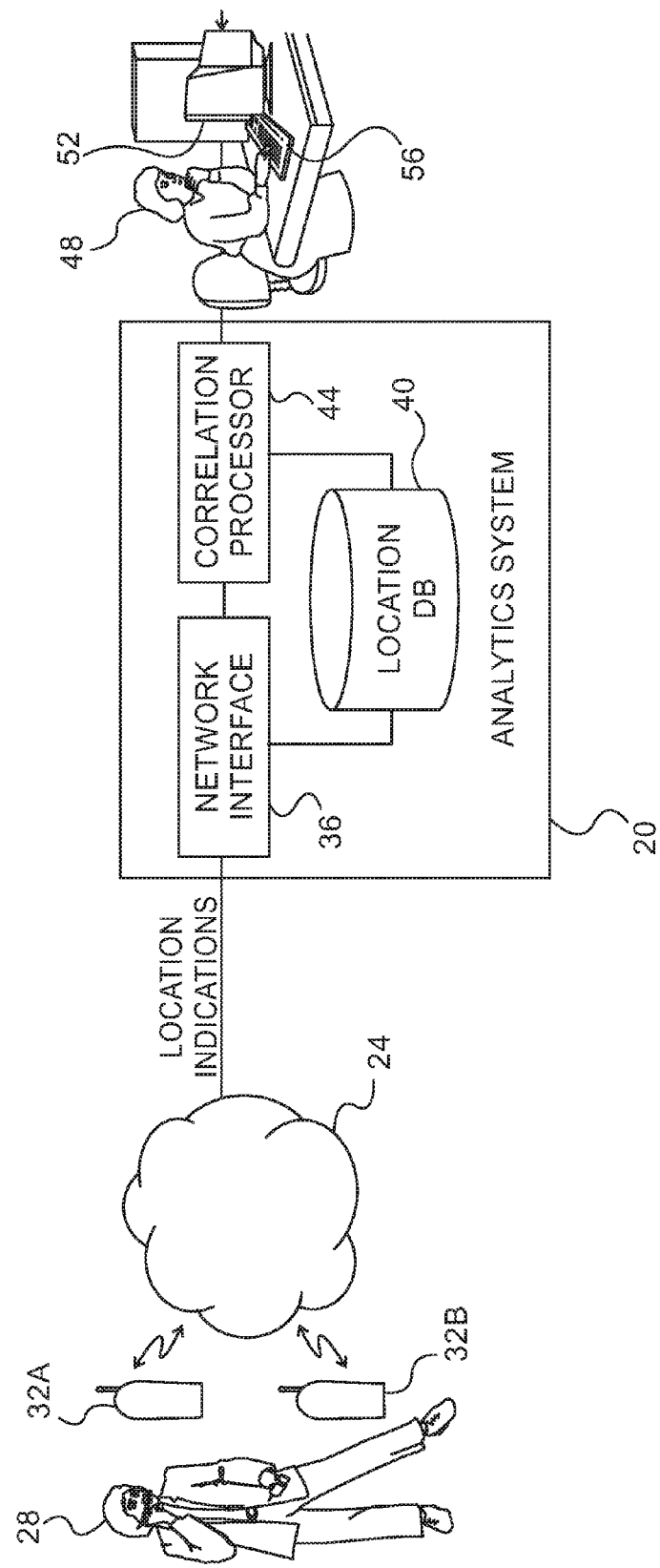
FIG. 1 is a block diagram that schematically illustrates a communication analytics system, in accordance with an embodiment of the present disclosure.

DETAILED DESCRIPTION OF EMBODIMENTS
OVERVIEW

A given user may operate multiple communication terminals, e.g., cellular phones, for various reasons. For example, a user may use one cellular phone for work-related calls and a different phone for personal calls. Another user may use cellular phones belonging to different networks or service providers in order to take advantage of different pricing plans. A user may operate different types of terminals, e.g., a cellular phone and a wireless-enabled mobile computer or Personal Digital Assistant (PDA). As yet another example, a user may divide his or her activity among different phones in order to evade surveillance, for example by conducting innocent calls on one phone and illegitimate communication on another.

In some applications, such as anti-terrorism and surveillance applications, it is important to identify the different communication terminals that are associated with a given user. In many cases, a given terminal is known to be owned or operated by a target user, and it is desirable to identify other terminals associated with the same user. It may be possible in principle to associate different terminals by correlating the parties with which the terminals communicate ("buddy lists"), or by correlating the usage statistics of different terminals over time. In practice, however, these correlation processes are not always feasible or accurate. As can be seen in the examples given above, users sometimes intentionally communicate with different parties using different terminals. In many cases (e.g., when using different pricing plans of different service providers or when using different phones for personal and work-related communication) the activity periods of the different terminals have little or no overlap.

Embodiments that are described herein provide improved methods and systems for associating multiple communication terminals with a given user. The disclosed methods and systems associate different communication terminals based on spatial correlation, i.e., based on the geographical locations of the terminals.

In a typical embodiment, a certain target user is known to own or operate a certain communication terminal (e.g., cellular phone). In order to identify additional terminals associated with this user, historical location indications are obtained for the known terminal. (Typically, the location indications comprise location measurements that are obtained from one or more wireless networks with which the terminals communicate.) Each location indication indicates the geographical location of the terminal at a given time. The location indications of the known terminal are correlated with location indications of other terminals. When significant spatial correlation is found between the known terminal and another terminal, the other terminal is assumed likely to be associated with the same target user. In some embodiments, time series of location indications are constructed for both the known terminal and for the other terminals. If the time series of two terminals match one another, the terminals are regarded as spatially correlated.

Correlation indications may comprise positive and/or negative indications. A positive correlation indication indicates that the two terminals were located adjacent to one another at a given time. A negative correlation indication indicates that the two terminals were distant from one another at a given time. In many cases, negative correlation indications are especially powerful, and enable ruling out suspected associations between terminals.

In summary, the disclosed methods and systems enable highly-reliable association of multiple communication terminals with a given target user. Since these methods are based on spatial correlation and not on the activity profile of the user, they are relatively insensitive to various obfuscation measures that may be taken by users.

System Description

FIG. 1 is a block diagram that schematically illustrates a communication analytics system 20, in accordance with an embodiment of the present disclosure. The system can be used, for example, by a government or law enforcement agency to track mobile communication terminals (e.g., cellular phones) that are operated by individuals under surveillance. System 20 is connected to one or more wireless communication networks 24. Among other tasks, system 20 automatically associates communication terminals of networks 24 with users, using methods that are described in detail herein.

Each network 24 may comprise any suitable wireless communication network. The network may comprise, for example, a cellular network operating in accordance with any suitable cellular standard or protocol, such as a Universal Mobile Telecommunication System (UMTS) network, CDMA2000 network or other third generation (3G) cellular network, a Global System for Mobile communication (GSM) network or an Integrated Digital Enhanced Network (IDEN) network. Alternatively, network 24 may comprise a WiMAX network operating in accordance with the IEEE 802.16 standards or other wireless data network. The description that follows refers to a single communication network. Generally, however, the methods and systems described herein can be used with two or more communication networks, which may be of different types and/or be operated by different service providers.

Some of the users of network 24 may operate multiple mobile communication terminals. In the example of FIG. 1, a user 28 communicates with network 24 using two cellular phones 32A and 32B. When system 20 is connected to multiple communication networks, the terminals operated by user 28 may belong to the same network or to different networks. In general, user 28 may operate any desired number of terminals. The terminals may comprise, for example, cellular phones, wireless-enabled mobile computers or Personal Digital Assistants (PDAs), and/or any other suitable type of communication terminal. FIG. 1 shows a single user and two terminals for the sake of clarity. Generally, however, each network 24 supports a large number of users, some of which operate multiple terminals.

Network 24 measures the geographical locations of the communication terminals operated by its users. The network may use a variety of location tracking techniques for measuring the terminal locations. Some location tracking techniques, referred to as network-based techniques, are carried out by base stations and other network-side components of network 24, without necessarily using special hardware or software at the mobile terminal side. For example, Cell Identification (CID) techniques, also sometimes referred to as Cell Global Identity (CGI) techniques, locate the terminal by identifying the cell via which the terminal currently communicates. Enhanced CID (E-CID, also referred to as E-CGI) techniques combine CID information with timing information, which is indicative of the distance between the terminal and the base station. In UMTS networks, for example, the timing information may comprise Round-Trip Time (RTT) values. In GSM applications, timing information may comprise Time Advance (TA) values.

Another network-based location technique, called Uplink Time Difference of Arrival (U-TDOA), determines the terminal location by comparing and calculating the difference in time required for a transmission from the terminal to reach different base station sites. The arrival time measurements are made by Location Measurement Units (LMUs) installed at selected base station sites. Yet another technique, referred to as Angle of Arrival (AOA), determines the terminal location by establishing lines of bearing from base station sites to the terminal.

Other location tracking techniques are terminal-based, i.e., use special hardware or software in the terminal. For example, some techniques use measurements performed by a Global Positioning System (GPS) receiver installed in the communication terminal. In Assisted GPS (A-GPS) techniques, the GPS measurements are assisted by an assistance server external to the mobile terminal. The assistance server is sometimes equipped with another GPS receiver, whose position is known a-priori. Another terminal-based technique is Enhanced Observed Time Difference (E-OTD), in which the terminal measures the time differences between signal arrivals from different base stations. A similar terminal-based technique is called Enhanced Forward Link Trilateration (EFLT).

Yet another location tracking technique is based on a process in which the terminal measures and reports the downlink signal strengths of neighboring base stations. This process is sometimes referred to as Network Measurement Report (NMR). A set of signal strength values, from a given set of base stations, can be regarded as a fingerprint. Such a fingerprint is often indicative of the location in which the signal strengths were measured, and can therefore be used to assess the location of the terminal.

The location tracking techniques deployed in network 24 may be passive or active. Passive techniques perform unobtrusive probing of the signaling information transmitted in network 24, and extract location information from the monitored signaling. Active techniques, on the other hand, proactively request the network or the terminal to provide location information.

The various location measurements provided by network 24 are referred to herein as location indications. Each location indication indicates the geographical location of a given terminal at a given time. The accuracy of the location indication may vary depending on various factors, such as the type of location tracking technology used. Typical location accuracies range from several meters to several hundred meters. Generally, network 24 produces on the order of several tens of location indications per day for each terminal, although this number may vary considerably.

System 20 associates terminals with users by processing the location indications produced by network 24. System 20 comprises a network interface 36, which accepts the location indications from network 24. The system further comprises a location database 40, which stores the location indications of the different terminals. A correlation processor 44 applies the spatial correlation methods described herein. The correlation results are provided to an operator 48 using a suitable output device, such as a display 52. The operator manipulates the correlation results, provides input and otherwise controls system 20 using an input device such as a keyboard 56.

Typically, correlation processor 44 comprises a general-purpose computer, which is programmed in software to carry out the functions described herein. The software may be downloaded to the computer in electronic form, over a network, for example, or it may, alternatively or additionally, be provided and/or stored on tangible media, such as magnetic, optical, or electronic memory. Database 40 may be stored on any suitable storage device, such as a storage disk, or in a memory of processor 44.

Spatial Correlation Method Descriptions

Figure 2:
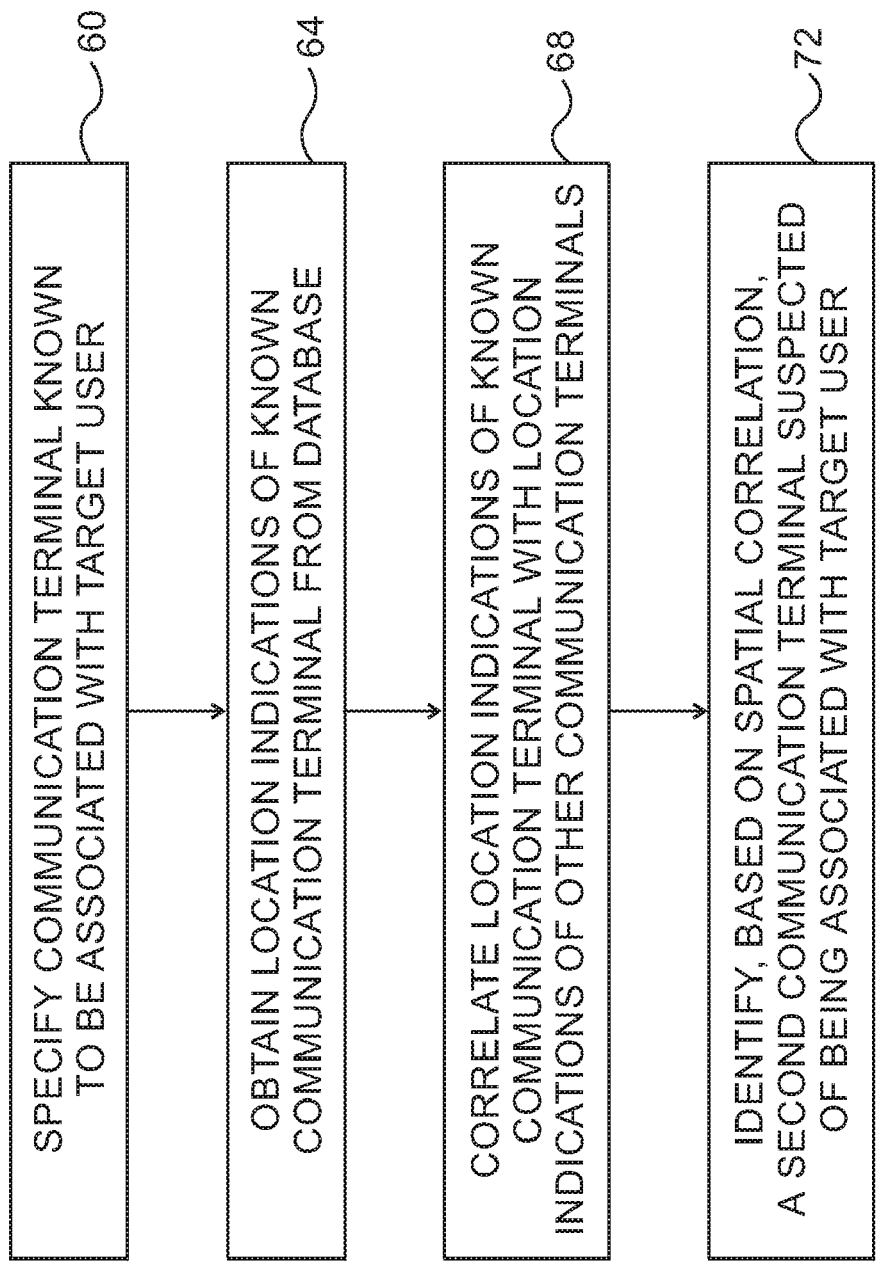
FIGS. 2 and 3 are flow charts that schematically illustrate methods for associating multiple communication terminals to a given target user, in accordance with embodiments of the present disclosure.

FIG. 2 is a flow chart that schematically illustrates a method for associating multiple communication terminals to a given target user, in accordance with an embodiment of the present disclosure. The method begins with operator 48 specifying to system 20 a certain target user, which is known to be associated with a certain communication terminal, at a target specification step 60. Processor 44 queries database 40 and retrieves historical location indications of the known terminal, at a known terminal history retrieval step 64. The historical information typically comprises a set of location indications, i.e., a set of location measurements taken at respective known measurement times.

Processor 44 correlates the location indications of the known terminal with location indications of other terminals in network 24, at a correlation step 68. Generally, the location indications of different terminals may originate from the same network or from different networks. The location indications of different terminals may be acquired using the same location tracking technique or using different location tracking techniques (in the same network or in different networks).

In a typical implementation, processor 44 considers as possible candidates for correlation terminals that were in proximity to the known terminal at a given time. Both geographical proximity and time proximity are defined in terms of ranges, so as to accommodate errors in the measurement of these parameters. Errors in geographical proximity may be caused, for example, by the limited accuracy of the location measurements performed by the communication network. An error in time proximity may be introduced, for example, when the known terminal and a candidate terminal belong to different networks having different time bases, or when a given terminal is idle and therefore has relatively sparse location indications.

In a typical process, processor 44 considers the terminals that were located within a certain geographical proximity of the known terminal during a certain time proximity range (e.g., within 500 meters of the known terminal, ±30 minutes from a certain location indication of the known terminal). Processor 44 typically repeats this process for other location indications of the known terminal (e.g., the location indications over a period of 1-7 days), and attempts to identify terminals that repeatedly exhibit this kind of geographical/time proximity around the other location indications of the known terminal. The identified terminals are regarded as likely candidates for correlation with the known terminal.

Figure 3:
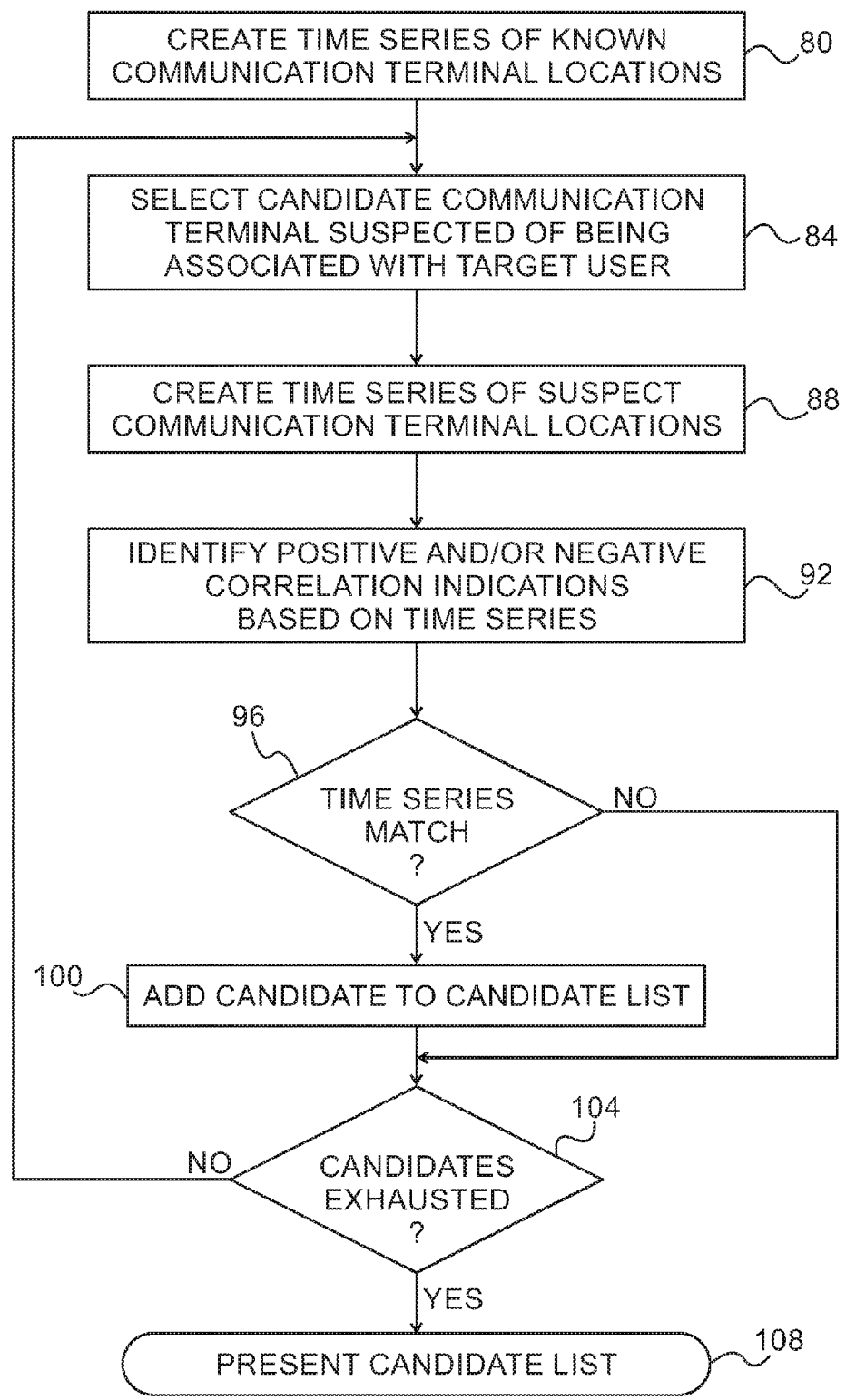

Typically, processor 44 queries database 40 and obtains historical location indications of the terminals that are considered likely candidates for correlation. Processor 40 then correlates the location indications of these terminals with the location indications of the known terminal of the target user over a relatively long time period (e.g., one month). An example correlation method is shown in FIG. 3 below. Based on the spatial correlation, processor 44 identifies one or more terminals that exhibit strong spatial correlation with the known terminal, at an identification step 72. Such terminals are suspected of being associated with the target user, as well. Processor 44 reports the suspected terminals to the operator.

FIG. 3 is a flow chart that schematically illustrates a method for associating multiple communication terminals to a given target user, in accordance with an embodiment of the present disclosure. This method is based on comparing time series of location estimates of the known terminal and of other terminals, which are regarded as likely to be associated with the target user. The candidate terminals may be identified and selected using the techniques described above.

The method of FIG. 3 begins with correlation processor 44 creating a time series of location indications of the known communication terminal, at a known time series generation step 80. The time series typically comprises a set of location estimates, which are ordered in ascending order of time. The location estimates are typically derived from the location indications of the terminal, as will be explained below.

Processor 44 selects a candidate communication terminal, which is suspected of being associated with the target user, at a candidate selection step 84. In some embodiments, processor 44 chooses a certain location indication of the known terminal measured at a given time (e.g., at the beginning of the time series). The processor then selects the candidate from among the terminals, which were located in the vicinity of the known terminal at the given time. Alternatively, however, processor 44 may use any other suitable criterion for selecting the candidate terminal. Having selected the candidate, processor 44 creates a time series of the locations of this candidate, at a candidate time series generation step 88.

Processor 44 compares the time series of the known terminal, which is known to be associated with the target user, with the time series of the candidate suspect terminal. As noted above, multiple terminals of the same user are often operated at time periods having little or no overlap. Moreover, the location indications of each terminal are often produced at a low frequency (e.g., 30-50 per day). Therefore, in order to compare the locations of the two terminals, processor 44 usually generates each time series by interpolating the location indications of the terminal in question. The interpolation enables processor 44 to estimate the locations of the two terminals at time periods for which no location indications are available. Thus, each time series comprises a series of location estimates that correspond to respective times, and can therefore be compared to one another. The location estimates are derived from the location indications, for example by interpolation.

The processor attempts to identify both positive and negative correlation indications between the two time series, so as to assess the level of spatial correlation between the two terminals, at a correlation identification step 92. A positive correlation indication indicates that the two terminals were located adjacently to one another (i.e., closer to one another than a predefined distance) at a certain time. A high number of positive correlation indications along the time series increases the likelihood that the candidate terminal is indeed associated with the target user. A negative correlation indication, on the other hand, indicates that the two terminals were distant from one another (i.e., separated by more than a predefined distance) at a given time. Such an indication usually indicates with high likelihood that the candidate terminal is not associated with the target user.

Processor 44 may assign confidence level to the negative correlation indications, based on the activity of the terminals during the relevant time period. For example, the processor may regard a negative correlation indication as especially strong when the two terminals are active simultaneously in different locations. A negative correlation is also strong if the two terminals are active at times and distances that do not overlap but cannot be attributed to a single user (e.g., active 5 minutes from one another at locations that are 100 Km apart). In some scenarios, however, terminals that are distant from one another at a given time do not necessarily imply a negative correlation. For example, if one of the terminals is static and idle (i.e., does not move and does not make calls), processor 44 may conclude that the terminal is not carried by its user and should therefore not be used for generating negative correlation indications.

Based on the positive and negative indications, processor 44 checks whether a sufficient match exists between the time series of the known terminal and of the candidate terminal, at a match checking step 96. If the time series match, i.e., if sufficient spatial correlation is found between the known terminal and the candidate terminal, the processor adds the candidate terminal to a list of candidates that are suspected of being associated with the target user, at a list addition step 100.

Processor 44 then checks whether all candidates have been exhausted, at a candidate checking step 104. If there are additional candidates to be examined, the method loops back to step 84 above, in which processor 44 selects the next candidate terminal. Otherwise, processor 44 outputs the list of candidates that are suspected of being associated with the target terminal, at an output step 108. The list is typically displayed to operator 48 on display 52. The processor may provide the operator with any suitable information regarding the candidates on the list, such as the candidates' phone numbers or other identities.

In some embodiments, processor 44 computes a quantitative correlation score for each candidate terminal, based on the positive and negative correlation indications. Typically, a terminal having strong positive correlation and very weak negative correlation with the known terminal will be assigned a high score. The processor may order the candidate list that is displayed to the operator in descending order of this score, such that the most likely candidates are displayed first. The processor may also present the actual scores along with the candidate identities. In some embodiments, the quantitative score is also used as the criterion for choosing whether to add a candidate to the list, at step 96 above.

In some embodiments, the candidate selection process is carried out in an iterative manner along the time series. In such a process, processor 44 starts at the beginning of the time series of the known terminal. The processor initially selects a set of candidates that were located adjacently to the known terminal at the beginning of the time series. As noted above, processor 44 typically considers terminals that were in proximity to the known terminal within a certain time window (e.g., 30 minutes or more), in order to account for time-base differences between networks and idle terminals that generate location indications at relatively large time intervals.

Then, the processor moves to a later point in time, and removes from the set candidates that are distant from the known terminal at that time. The processor continues this process, progressively moving to later points in time and gradually narrowing the set of candidates based on negative correlation indications. At the end of the process, the remaining candidates in the set have only positive correlation indications and no negative correlation indications with respect to the known terminal.

The criteria and/or thresholds used by processor 44 in determining positive and negative correlation indications may vary under different circumstances, e.g., depending on the accuracy of the location indications provided by network 24. For example, when the location indications are highly accurate (e.g., when they originate from GPS measurements by the terminals), the processor may regard a distance of 100 m between the terminals as a negative correlation indication. When the location indications are less accurate (e.g., when they originate from CID measurements), even a distance of 500 m may be regarded as a positive correlation indication. Generally, if the distance between two location indications can be realistically traversed in a time period that is equal to the time difference between the time stamps of the location indications, they can be regarded as a positive correlation indication.

The methods described herein are particularly effective, since they are based on the geographical locations of the terminals and not of their activity profile. For example, relying on activity profiles may produce high correlation between two users who live in the same neighborhood and work in the same office block. When using the disclosed location-based schemes, these users can be distinguished by examining their off-work locations, which would probably produce negative correlation indications. Moreover, the disclosed methods are relatively insensitive to various obfuscation measures that can be taken by the target user in order to evade surveillance. Such measures may comprise, for example, occasional replacement of the terminal's Subscriber Identity Module (SIM) or even of the entire terminal.

Although the embodiments described herein mainly address association of mobile communication terminals to users for surveillance applications, the principles of the present disclosure can also be used for other applications, such as fraud prevention (e.g., for identifying fraudulent users who falsify their identities and purchase multiple handsets).

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
  obtaining with a network interface first location indications of a first communication terminal that is associated with a given user;
  using the first location indications, determining one or more candidate communication terminals that are suspected of being associated with the given user;
  computing a correlation between the first location indications and second location indications of the identified candidate communication terminals; and
  responsively to the correlation, identifying from among the candidate communication terminals at least one second communication terminal that is associated with the given user,
  wherein computing the correlation comprises identifying a positive correlation indication between the first communication terminal and a given candidate communication terminal, which indicates that a distance between the first communication terminal and the given candidate communication terminal was less than a predefined value during a given time interval.

2. The method according to claim 1, wherein the first and second location indications comprise location measurements received from at least one communication network with which one or more of the communication terminals communicate.

3. The method according to claim 1, wherein the first location indications are received from a first communication network, and wherein the second location indications of the second communication terminal are received from a second communication network, different from the first communication network.

4. The method according to claim 1, wherein the first location indications are measured using a first location measurement technique, and wherein the second location indications of the second communication terminal are measured using a second location measurement technique, different from the first location measurement technique.

5. The method according to claim 1, wherein determining the candidate communication terminals comprises selecting an initial set of the candidate communication terminals whose second location indications are correlative with the first location indications at a first time interval, and removing from the set at least one of the candidate communication terminals whose second location indications are not correlative with the first location indications at a second time interval, different from the first time interval.

6. The method according to claim 1, wherein computing the correlation comprises identifying a negative correlation indication between the first communication terminal and a given candidate communication terminal, which indicates that a distance between the first communication terminal and the given candidate communication terminal was larger than a predefined value during a given time interval.

7. The method according to claim 6, wherein identifying the negative correlation indication comprises assigning a confidence level to the negative correlation indication responsively to an activity of the first communication terminal and the given candidate communication terminal during the given time interval.

8. The method according to claim 1, wherein computing the correlation comprises processing the first location indications to produce a first time series representing a first location of the first communication terminal as a function of time, processing the second location indications of one of the candidate communication terminals to produce a second time series representing a second location of the one of the candidate communication terminals as a function of the time, and comparing the first and second time series.

9. The method according to claim 8, wherein processing the first and second location indications comprises interpolating the respective first and second location indications to produce the first and second time series.

10. The method according to claim 1, and comprising presenting the identified at least one second communication terminal to an operator.

11. The method according to claim 1, wherein computing the correlation comprises computing respective correlation scores for at least some of the candidate communication terminals, and selecting the at least one second communication terminal responsively to the correlation scores.

12. The method according to claim 11, and comprising presenting the identified at least one second communication terminal and the respective correlation scores to an operator.

13. Apparatus, comprising:
  an interface, which is coupled to accept location indications of communication terminals; and
  a processor, which is configured to determine, using first location indications of a first communication terminal that is associated with a given user, one or more candidate communication terminals that are suspected of being associated with the given user, to compute a correlation between the first location indications and second location indications of the identified candidate communication terminals, and to identify from among the candidate communication terminals, responsively to the correlation, at least one second communication terminal that is associated with the given user,
  wherein the processor is configured to identify a positive correlation indication between the first communication terminal and a given candidate communication terminal, which indicates that a distance between the first communication terminal and the given candidate communication terminal was less than a predefined value during a given time interval.

14. The apparatus according to claim 13, wherein the interface is coupled to accept the first and second location indications by receiving location measurements from at least one communication network with which one or more of the communication terminals communicate.

15. The apparatus according to claim 13, wherein the interface is coupled to receive the first location indications from a first communication network, and to receive the second location indications of the second communication terminal from a second communication network, different from the first communication network.

16. The apparatus according to claim 13, wherein the first location indications are measured using a first location measurement technique, and wherein the second location indications of the second communication terminal are measured using a second location measurement technique, different from the first location measurement technique.

17. The apparatus according to claim 13, wherein the processor is configured to select an initial set of the candidate communication terminals whose second location indications are correlative with the first location indications at a first time interval, and to remove from the set at least one of the candidate communication terminals whose second location indications are not correlative with the first location indications at a second time interval, different from the first time interval.

18. The apparatus according to claim 13, wherein the processor is configured to identify a negative correlation indication between the first communication terminal and a given candidate communication terminal, which indicates that a distance between the first communication terminal and the given candidate communication terminal was larger than a predefined value during a given time interval.

\* \* \* \* \*